Patented May 4, 1954

2,677,690

UNITED STATES PATENT OFFICE 2,677,690

REACTION PRODUCTS OF 3-ARYL-5-MER-CAPTO -1,3,4-THIADIAZOLE-2(3)-THIONES AND N - SUBSTITUTED THIOCARBAMYL HALIDES AND THEIR PREPARATION

Roland H. Goshorn, Trenton, and William W. Levis, Jr., Wyandotte, Mich., assignors to Sharples Chemicals Inc., a corporation of Delaware No Drawing. Application February 11, 1952, Serial No. 271,073

19 Claims. (Cl. 260—302)

1

The present invention pertains to a new process for the preparation of new products which are useful for various purposes such as oil additives, as vulcanization accelerators, as plant response agents, etc.

The structure of these new compounds, and their preparation from N-substituted thiocarbamyl halides and mercaptides of 3-aryl-5-mercapto-1,3,4-thiadiazole-2(3)-thiones, is illustrated as follows:

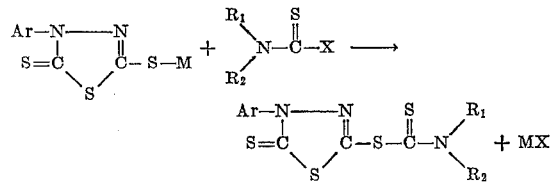

wherein M represents a monovalent metal or metalloid cation such as an alkali metal or ammonium; wherein Ar represents an aryl radical having from 0 to 3 substituents on the aryl nucleus, such as halogen and alkyl substituents; wherein X represents a halogen; wherein $R_1$, taken individually, represents one of the group consisting of alkyl, aralkyl, aryl, alkaryl, cycloalkyl, alkyl-substituted cycloalkyl, furfuryl, and tetrahydrofurfuryl radicals; wherein $R_2$, taken individually, represents one of the group consisting of alkyl, aralkyl, cycloalkyl, alkyl-substituted cycloalkyl, furfuryl, and tetrahydrofurfuryl radicals; and wherein $R_1$ and $R_2$, taken collectively, represent one of the group consisting of polymethylene and oxapolymethylene radicals.

It will be understood that $R_1$ and $R_2$, when taken individually, may be the same or different in the N-substituted thiocarbamyl halide reactants; the same applies to the products of the invention.

Examples of alkali metals are sodium and potassium. Examples of halogens are chlorine, bromine, and iodine.

Examples of alkyl radicals are those containing from 1 to 18 carbon atoms, such as methyl, ethyl, propyl, butyl, amyl, etc., and proceeding through octadecyl, and higher, and including isomeric forms thereof. Examples of aralkyl radicals are benzyl, phenylethyl and phenylpropyl. Examples of aryl radicals are phenyl, alpha-naphthyl, and beta-naphthyl. Examples alkaryl radicals are tolyl, zylyl, trimethylphenyl, ethylphenyl, propylphenyl, butylphenyl, amylphenyl, methylbutylphenyl, dimethylethylphenyl, methylnaphthyl, butylnaphthyl, amylnaphthyl, di- and trimethylnaphthyl, and ethylbutylnaphthyl, including isomeric forms thereof. Examples of other substituted aryl radicals are mono-, di- and trichlorophenyl, iodophenyl, bromophenyl, tribromophenyl, chlorodibromophenyl, chlorotolyl, amylbromophenyl, bromoxylyl, propyldichlorophenyl, mono-, di- and trichloronaphthyl, dibromonaphthyl, iodonaphthyl, bromochloronaphthyl, dimethylchloronaphthyl, diamylbromonaphthyl, ethyldichloronaphthyl, and amyliodonaphthyl, including isomeric forms thereof. Examples of cycloalkyl radicals are cyclopropyl, cyclobutyl, cyclopentyl, cyclohexyl, cycloheptyl, cyclooctyl, and decahydronaphthyl. Examples of alkyl-substituted cycloalkyl radicals are methylcyclohexyl, dimethylcyclohexyl, ethylcyclohexyl, amylcyclohexyl, hexylcyclohexyl, methylcyclobutyl, methylcyclopentyl, methylcycloheptyl, and methylcyclooctyl, including isomeric forms thereof. When $R_1$ and $R_2$ are taken collectively, examples of such radicals are tetramethylene, pentamethylene, hexamethylene, and 3-oxapentamethylene.

The N-substituted thiocarbamyl halides which may be employed in the reaction include those in which the nitrogen atom is twice substituted by similar alkyl radicals, e. g. dimethyl-, diethyl-, dipropyl-, dibutyl-, diamyl-, dihexyl-, diheptyl-, dioctylthiocarbamyl chlorides, etc.; or by two dissimilar alkyl radicals, e. g. methyl-ethyl-, ethyl-propyl-, methyl-propyl-, methyl-octadecyl-thiocarbamyl chlorides, etc.; or by a single polymethylene radical, e. g. tetramethylene-, pentamethylene-, hexamethylenethiocarbamyl chlorides, etc.; or by a single oxapolymethylene radical, e. g. 3-oxapentamethylenethiocarbamyl chloride, etc.; or by one aryl and one alkyl radical, e. g. phenyl-methyl-, phenyl-ethyl-, phenyl-propyl-, naphthyl-methylthiocarbamyl chlorides, etc.; or by one alkyl and one alkaryl radical, e. g. methyl-tolyl-, ethyl-tolyl-, propyl-tolyl-, methyl-xylyl-, ethyl - xylyl, propyl - xylylthiocarbamyl chlorides, etc.; or by one alkyl and one aralkyl radical, e. g. methyl-benzyl-, ethyl-benzyl-, propyl - benzyl-, methyl - phenylethyl-, ethyl-phenylethyl-, propyl-phenylethyl-thiocarbamyl chlorides, etc.; or by one aryl and one arakyl radical, e. g. phenyl-benzyl-, phenyl-phenylethyl-thiocarbamyl chlorides, etc.; or by two arakyl radicals, e. g. dibenzyl-, benzyl-phenylethyl-, diphenylethylthiocarbamyl chlorides, etc.; or by one alkyl and one cycloalkyl radical, e. g. methyl-cyclohexyl-, ethyl-cyclohexyl-, amyl-cyclohexyl-, methylcyclopropylthiocarbamyl chlorides, etc.; or by one alkyl and one alkyl-substituted cycloalkyl radical, e. g. methyl-methylcyclohexyl-, ethyl-amylcyclohexyl-, propyl-methylcyclobutylthiocarbamyl chlorides, etc.; or by one aralkyl and one cycloalkyl radical, e. g. benzyl-cyclohexyl-, phenylethylcyclohexylthiocarbamyl chlorides, etc.; or by one aryl and one cycloalkyl radical, e. g. phenyl-cyclohexyl-, phenyl-cyclopentyl-, naphthyl-cyclohexylthiocarbamyl chlorides, etc.; or by one aryl and one alkyl-substituted cycloalkyl radical, e. g. phenyl-dimethylcyclohexyl-, naphthyl-ethylcyclohexylthiocarbamyl chlorides, etc.; or by one alkaryl and one aralkyl radical, e. g. tolyl-benzyl-, xylyl-benzyl-, methylnaphthylbenzyl-, tolyl-phenylethylthiocarbamyl chlorides, etc.; or by one alkaryl and one cycloalkyl radical, e. g. xylyl-cyclohexyl-, tolylcyclobutyl-, amylnaphthyl-cyclohexylthiocarbamyl chlorides, etc.; or by one alkaryl and one alkyl-substituted cycloalkyl radical, e. g. tolyl-dimethylcyclohexyl-, methylnaphthyl - methylcyclohexylthiocarbamyl chlorides, etc.; or by two cycloalkyl radicals, e. g. dicyclopropyl-, dicylclohexyl-, cyclobutylcyclopentylthiocarbamyl chlorides, etc.; or by one cycloalkyl and one alkyl-substituted cycloalkyl radical, e. g. cyclohexyl-methylcyclohexyl-, cyclopropyl-methylcyclobutylthiocarbamyl chlorides, etc.; or by two alkyl-substituted cycloalkyl radicals, e. g. bis(methylcyclohexyl)-, methylcyclobutyl-amylcyclohexylthiocarbamyl chlorides, etc.; or by two similar or dissimilar furfuryl or tetrahydrofurfuryl radicals, e. g. difurfuryl-, furfuryltetrahydrofurfuryl-, and bis(tetrahydrofurfuryl)-thiocarbamyl chlorides; or by two dissimilar radicals, e. g. methyl-furfuryl-, amyl-furfuryl-, ethyl-tetrahydrofurfuryl-, benzyl - methylcyclohexyl-, benzyl-furfuryl-, phenylethyl-tetrahydrofurfuryl-, phenyl-furfuryl-, naphthyl-tetrahydrofurfuryl-, xylyl-furfuryl-, tolyl-tetrahydrofurfuryl-, cyclohexyl-furfuryl-, cyclohexyl-tetrahydrofurfuryl-, amylcyclohexyl-furfuryl-, methylcyclohexyl - tetrahydrofurfurylthiocarbamyl chlorides, etc.

Preferably the number of carbon atoms per hydrocarbon radical attached to the nitrogen atom of the N-substituted thiocarbamyl halide does not exceed 8, and more particularly does not exceed 6. When the aryl radical Ar attached to position 3 of the above heterocyclic ring has one or more alkyl substituents, it is preferred that each such substituent contain no more than 5 carbon atoms, and that the number of carbon atoms in any such substituted aryl radical does not exceed 16.

Of particular interest are those products of the invention in which the carbamate nitrogen atom is substituted by a pentamethylene radical or by two identical alkyl radicals containing from 1 to 8 carbon atoms in each alkyl radical, and in which Ar is an unsubstituted phenyl radical.

In conducting the reaction, the reactants are brought together and reacted preferably in the presence of a solvent or liquid diluent which is non-reactive in the prevailing environment. The mercaptide may be introduced into the N-substituted thiocarbamyl halide or alternatively the latter may be introduced into the former. In general, however, it is preferred to introduce the N-substituted thiocarbamyl halide which may be in the form of a finely divided solid, a liquid, a solution, or a suspension, into an aqueous solution of the mercaptide.

Any desired concentration of said aqueous mercaptide solution may be employed, such as up to the saturation concentration at the prevailing temperature, and in certain instances it may even be desirable to have some of the mercaptide present in solid form. A 15–20% solution, for example, is very satisfactory when the sodium mercaptide of 5-mercapto-3-phenyl-1,3,4-thiadiazole-2(3)-thione is being reacted.

The N-substituted thiocarbamyl halide may be added to the aqueous solution or suspension of the mercaptide in the form of a finely divided solid, but more preferably as a liquid, for example, as molten material (in the case of normally solid halides), or in the form of a solution. The particular solvent employed is not highly critical providing it be substantially inert in the reaction environment. Likewise, the amount employed may vary widely, although it may often be desirable to employ sufficient solvent to maintain the halide in liquid phase. Suitable solvents, for example, include hydrocarbons such as hexane, petroleum naphtha, benzene, toluene, etc., and chlorinated hydrocarbons, such as carbon tetrachloride, chlorobenzene, etc.

It will be understood, of course, that the melting points of the N-substituted thiocarbamyl halides coming within the scope of this invention will differ widely; in fact, many are liquids at temperatures well below those contemplated for the preferred conduct of the process. In such event, the non-reacting liquid, if employed, will function primarily as a diluent for the halide, and possibly also as a solvent for the product.

Regardless of the order of addition of the reactants or of the particular physical form of the reactants prior to mixing, it is highly desirable that the reaction mixture be subjected to agitation during the progress of the reaction.

Reaction usually occurs readily at room temperature, reaction temperatures below 100° C. being preferred, such as between 0° C. and 100° C., and more particularly between 20° C. and 80° C. Lower temperatures may be used, but usually are attended by a reduced velocity of reaction and a reduced fluidity of the reaction mixture. Higher temperatures may be employed, but consideration should be given to the thermal stability of the N-substituted thiocarbamyl halide being reacted, as well as of the desired reaction product.

The reaction may be carried out at any desired pressure, such as atmospheric, sub-atmospheric, or superatmospheric, atmospheric pressure being very suitable. Also the reaction may be carried out in batch, semi-continuously, or continuously as desired.

The organic products of the reaction may be readily purified and may be shown by chemical analysis to correspond closely in empirical formula to the respective expected and desired products. These products are effective in increasing the stability of lubricants such as hydrocarbon lubricating oils and greases against oxidative deterioration, sludge formation, and the like, and also impart to such lubricants improved high pressure properties. They also are effective rubber vulcanization accelerators.

The mercaptide starting materials may be derived from any source known in the art, or may be made by procedures such as are illustrated in the examples below.

Likewise, the N-substituted thiocarbamyl halides may be prepared by any means known in the art, such as by the process described and claimed in U. S. Patent 2,466,276.

Substituted thiocarbamyl chlorides are frequently obtained admixed with free sulfur. If desired, the chlorides may be separated from the sulfur before said chlorides are employed as reactants in the present invention. Alternatively, however, such admixtures may be employed for reaction purposes without separation, the sulfur being inert toward the reactants and the desired products. In such event, the products will of course contain sulfur as an impurity; if desired, the sulfur may be readily separated from said products.

The following examples are by way of illustration and not of limitation.

*Example 1*

An aqueous solution of the sodium mercaptide of 3-p-bromophenyl-5-mercapto-1,3,4-thiadiazole-2(3)-thione was prepared as follows. A 3-neck, 3-liter flask provided with stirrer, reflux condenser funnel, and thermometer was charged with 200 g. of p-bromophenylhydrazine hydrochloride and 1000 g. of water. This mixture was stirred at room temperature for 15 minutes, but most of the hydrochloride remained undissolved. A solution of 108 g. of sodium hydroxide in 500 g. of water was added, a thick slurry being thus produced.

Stirring was continued and 152 g. of carbon disulfide was slowly added to the slurry. The temperature of the mixture rose to 38° C. in about 30 minutes and most of the solid went into solution. Thirty minutes later the mixture was heated to 50° C., whereupon hydrogen sulfide started to evolve slowly. The temperature was maintained between 50° C. and 60° C. for 2 hours, then raised to 70° C. during the next hour, at which time hydrogen sulfide evolution had become quite small.

The solution was cooled to 50° C., and because of probable losses of carbon disulfide by entrainment with evolved hydrogen sulfide, 23 g. of carbon disulfide was added as make-up. The mixture was maintained between 50° C. and 65° C. for 2 hours; hydrogen sulfide was slowly evolved. Reduced pressure was applied to the system for a few minutes in order to remove excess carbon disulfide. The mixture was then maintained at about 90° C. for 1 hour, cooled, and filtered.

The filtrate was acidified by adding 200 g. of concentrated hydrochloric acid, with stirring, a voluminous white precipitate being thus formed. The mixture was diluted with 1 liter of water, and the white solid was filtered off and washed with water. The solid was then stirred for 1 hour in a solution of 30 g. (0.75 mole) of sodium hydroxide in 500 g. of water. The resulting solution was filtered to remove a small amount of insoluble material, the filtrate being clear and yellow. Addition of a few drops of dilute hydrochloric acid caused cloudiness; the solution was therefore assumed to contain 0.75 mole of the mercaptide named above.

This solution was placed in a 2-gallon glass vessel equipped with thermometer, electrically heated dropping funnel, and high-speed stirrer. Stirring was commenced and 119 g. of diethylthiocarbamyl chloride (containing approximately 5% free sulfur), maintained at about 50° C. in the funnel, was added in 30 minutes; the temperature of the reaction mixture rose from 25° C to 37° C.

The product formed as an oil which congealed to a tarry mass. This mass was removed from the liquid and dissolved in 1 liter of acetone at 50° C. The hot solution was filtered to remove a small amount of insoluble material, the filtrate was cooled to 25° C., and 1 liter of methanol was slowly added with stirring. There was thus obtained a slurry containing crystalline material. This slurry was cooled to 0° C. and filtered. The 3 - p - bromophenyl - 2 - thiono - 1,3,4 - thiadiazolinyl-5-diethyldithiocarbamate thus obtained was air-dried, after which it was found to weigh 265 g. and to melt 81.5–84.5° C.

This product was purified by recrystallization from a mixture of 350 ml. each of benzene and hexane. The purified compound weighed 200 g.; melting point, 85–86° C. Calculated for $C_{13}H_{14}BrN_3S_4$:

N, 9.99%; Br, 19.01%. Found: N, 9.87, 9.97%; Br, 19.10, 19.15%.

*Example 2*

The following procedure was used to prepare an aqueous solution of the sodium mercaptide of 5-mercapto-3-alpha-naphthyl-1,3,4-thiadiazole-2(3)-thione. The apparatus used in Example 1 was charged with 200 g. of alpha-naphthylhydrazine hydrochloride and 1000 g. of water. Only a small part of the hydrochloride was brought into solution by stirring the solution at room temperature for 15 mintes. A solution of 124 g. of sodium hydroxide in 500 g. of water was added, a slurry being produced.

Carbon disulfide (160 g.) was slowly added to the stirred mixture; during the next 30 minutes the temperature of the mixture rose to 40° C. and most of the solid dissolved. After 45 minutes, the mixture was heated; it was maintained between 70° C. and 80° C. for 4 hours and then between 80° C. and 90° C. for 2 hours. Hydrogen sulfide was slowly evolved during this 6-hour period.

The mixture was cooled to 50° C. and 23 g. of carbon disulfide was added as make-up. Temperature was maintained between 55° C. and 65° C. for 3 hours, a very slow evolution of hydrogen sulfide occurring during this time. Excess carbon disulfide was then removed by placing the reaction system under reduced pressure for a few minutes. The mixture was held at 100° C. for 1 hour, cooled, and filtered.

The filtrate was diluted with 1 liter of water and acidified with 220 g. of concentrated hydrochloric acid. Hydrogen sulfide was evolved, and a voluminous orange precipitate was formed. The precipitate was filtered off, washed with water, and stirred for 1 hour with a solution of 32 g. (0.8 mole) of sodium hydroxide and 600 g. of water. The resulting solution was filtered to remove a small amount of insoluble material; the filtrate was clear and red. Cloudiness was produced by a few drops of dilute hydrochloric acid; it was assumed that the solution contained 0.8 mole of the desired mercaptide.

This solution was transferred to a 2-gallon glass vessel equipped as described in Example 1. Stirring was commenced and 121 g. of distilled diethylthiocarbamyl chloride, maintained at about 50° C., was added in 30 minutes; the temperature of the reaction mixture rose from 25° C. to 35° C. After 10 minutes of additional stirring, a solution of 8 g. of sodium hydroxide in 50 g. of water was added and the mixture was stirred for 20 minutes.

The resulting slurry was filtered to recover 3-alpha - naphthyl - 2 - thiono - 1,3,4 - thiadiazolinyl - 5 - diethyldithiocarbamate. This product, after being washed with water and dried at 75° C., was a tan solid weighing 222 g. and melting at 148–154° C. to a turbid liquid. It was dissolved in 4 liters of acetone at 25° C. and the solution was cooled to 0° C. The product obtained from this recrystallization melted at 152–154° C., with turbidity. Another recrystallization from 2500 ml. of acetone yielded the desired compound as a light-tan solid which melted to a clear liquid at 153–154° C. Calculated for $C_{17}H_{17}N_3S_4$: N, 10.74%; S, 32.74%. Found: N, 11.14%; S, 33.20%.

*Example 3*

An aqueous solution of the sodium mercaptide of 5-mercapto-3-phenyl-1,3,4-thiadiazole-2(3)-thione was prepared as follows. A 3-neck, 3-liter flask provided with stirrer, reflux condenser, and thermometer well was charged with 108 g. of phenylhydrazine, 160 g. of carbon disulfide, and a solution of 120 g. of sodium hydroxide in 1000 g. of water. Stirring was commenced, and the temperature of the mixture rose rapidly from 20° C. to 38° C. After about 30 minutes the temperature had decreased slightly, at which time the solution was heated. It was maintained between 70° C. and 90° C. for 2 hours, cooled, diluted with 500 g. of water, and filtered to remove a small amount of black solid.

The resulting clear filtrate was stirred while concentrated hydrochloric acid containing 3.0 moles of hydrogen chloride was added in 15 minutes. Hydrogen sulfide was evolved copiously and the mixture became thick with a yellow precipitate. After 1 liter of water was added to the mixture, the precipitate was collected by filtration and washed with water.

This wet cake was dissolved in a solution comprising 30 g. (0.75 mole) of sodium hydroxide in 500 g. of water. Dilute hydrochloric acid was added to this solution until the solution became permanently cloudy, the amount of hydrogen chloride required being 0.3 mole. The solution (assumed to contain 0.45 mole of the above mercaptide) was filtered.

The filtrate was transferred to a 2-liter beaker provided with thermometer, electrically-heated dropping funnel, and high-speed stirrer. Stirring was commenced and distilled diethylthiocarbamyl chloride (61 g.), maintained molten in the funnel, was added in 20 minutes, the reaction mixture being maintained between 25° C. and 35° C. The mixture was stirred for 10 minutes more and then filtered. There was thus obtained a greenish-red solid, which was washed with water.

This solid was recrystallized twice from acetone. The purified 3-phenyl-2-thiono-1,3,4-thiadiazolinyl-5-diethyldithiocarbamate thus obtained was a light tan powder weighing 95 g. and melting at 114.5–116° C. Calculated for $C_{13}H_{15}N_3S_4$: S, 37.5%. Found: S, 37.5%.

For purposes of brevity and to avoid needless repetition of examples, it is merely necessary to point out: (1) that any other mercaptide of this invention may be substituted for the mercaptides employed in the above examples; (2) that any other N-substituted thiocarbamyl halide of this invention may be substituted for the diethylthiocarbamyl chloride employed therein; (3) that the same or any other suitable reaction conditions may be employed; all of which will be well understood by persons skilled in the art.

*Example 4*

This example illustrates the efficacy of a representative compound of the invention in accelerating the vulcanization of rubber. The particular compound employed was 3-phenyl-2-thiono-1,3,4-thiadiazolinyl - 5 - diethyldithiocarbamate. This accelerator was compounded with synthetic rubber (GR–S, a butadiene-styrene copolymer) according to the following formula:

| | |
|---|---:|
| GR–S | 100 |
| EPC black | 50 |
| Zinc oxide | 5 |
| Coal tar softener | 5 |
| Sulfur | 2 |
| Accelerator | 1 |

Samples of the composition thus prepared were vulcanized by heating in a press for varying periods of time at 307° F. The original physical properties of the vulcanizates were determined; the results are given in the table.

TABLE

ORIGINAL PROPERTIES

| Mins. Cure at 307° F. | Modulus, 300% | Tensile Strength | Elongation | Hardness |
|---|---|---|---|---|
| 45 | 610 | 2,090 | 670 | 59 |
| 60 | 810 | 2,380 | 610 | 63 |

While in the particular description, the invention has been illustrated as being carried out in aqueous media, it is to be understood that this is not a necessary condition, and that if desired any other suitable solvent or diluent, particularly if non-reactive in the prevailing environment of the reaction, may be employed, such as a hydrocarbon solvent which may be aliphatic or aromatic, for example, benzene, toluene, hexane, etc., or a chlorinated hydrocarbon solvent which may be aliphatic or aromatic, for example, carbon tetrachloride, chlorobenzene, etc.

Therefore, it is to be understood that the more particular description given above is by way of illustration, and that various modifications are possible and will occur to persons skilled in the art upon becoming familiar herewith. Accordingly, it is intended that the patent shall cover, by suitable expression in the claims, the features of patentable novelty which reside in the invention.

We claim:

1. Organic compounds having the formula

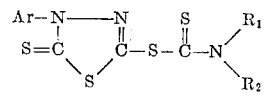

wherein Ar represents an aryl radical having from 0 to 3 substituents selected from the group consisting of halogen and alkyl radicals; wherein $R_1$ taken individually represents one of the group consisting of alkyl, aralkyl, aryl, alkaryl, cycloalkyl, alkyl-substituted cycloalkyl, furfuryl, and tetrahydro furfuryl radicals; wherein $R_2$ taken individually represents one of the group consisting of alkyl, aralkyl, cycloalkyl, alkyl-substituted cycloalkyl, furfuryl, and tetrahydrofurfuryl radicals; and wherein $R_1$ and $R_2$ taken collectively represent one of the group consisting of polymethylene and oxapolymenthylene radicals.

2. 3-phenyl - 2 - thiono-1,3,4-thiadiazolinyl-5-dialkyldithiocarbamate.

3. The compounds of claim 2 in which each alkyl group has from 1 to 8 carbon atoms.

4. 3-p-chlorophenyl - 2 - thiono-1,3,4-thiadiazolinyl-5-dialkyldithiocarbamate.

5. The compounds of claim 4 in which each alkyl group has from 1 to 8 carbon atoms.

6. 3-p-bromophenyl - 2 - thiono-1,3,4-thiadiazolinyl-5-dialkyldithiocarbamate.

7. The compounds of claim 6 in which each alkyl group has from 1 to 8 carbon atoms.

8. 3-p-bromophenyl - 2 - thiono-1,3,4-thiadiazolinyl-5-diethyldithiocarbamate.

9. 3-alpha-naphthyl - 2 - thiono-1,3,4-thiadiazolinyl-5-dialkyldithiocarbamate.

10. The compounds of claim 9 in which each alkyl group has from 1 to 8 carbon atoms.

11. 3 - phenyl-2-thiono-1,3,4-thiadiazolinyl-5-diethyldithiocarbamate.

12. 3-p-chlorophenyl - 2 - thiono-1,3,4-thiadiazolinyl-5-diethyldithiocarbamate.

13. 3 - alpha-naphthyl-2-thiono-1,3,4-thiadiazolinyl-5-diethyldithiocarbamate.

14. A process for the preparation of compounds having the formula

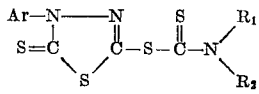

wherein Ar represents an aryl radical having from 0 to 3 substituents selected from the group consisting of halogen and alkyl radicals; wherein $R_1$ taken individually represents one of the group consisting of alkyl, aralkyl, aryl, alkaryl, cycloalkyl, alkyl-substituted cycloalkyl, furfuryl, and tetrahydrofurfuryl radicals; wherein $R_2$ taken individually represents one of the group consisting of alkyl, aralkyl, cycloalkyl, alkyl-substitued cycloalkyl, furfuryl, and tetrahydrofurfuryl radicals; and wherein $R_1$ and $R_2$ taken collectively represent one of the group consisting of polymethylene and oxapolymethylene radicals; comprising mixing together a compound having the formula

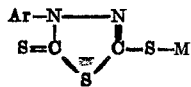

wherein M represents one of the group consisting of alkali metal and ammonium cations and Ar has the same meaning as above, and a compound having the formula

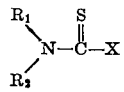

wherein X represents halogen and $R_1$ and $R_2$ have the same meanings as above; and maintaining said reactants in mutual contact until the desired product has been formed.

15. The process of claim 14 in which the reaction is conducted under temperature conditions not exceeding 100° C.

16. The process of claim 14 in which temperature conditions are maintained between 20° C. and 80° C.

17. The process of claim 14 in which the reaction is conducted in an aqueous medium.

18. The process of claim 14 in which X is chlorine.

19. The process of claim 18 in which the reaction is conducted in an aqueous medium.

References Cited in the file of this patent

UNITED STATES PATENTS

| Number | Name | Date |
|---|---|---|
| Re. 19,286 | Zaucker et al. | Aug. 21, 1934 |
| 2,331,749 | Watt | Oct. 12, 1943 |
| 2,524,082 | Ritter | Oct. 3, 1950 |